J. F. PARKER.
CASH REGISTER AND INDICATOR.
APPLICATION FILED AUG. 4, 1908.

913,551.

Patented Feb. 23, 1909.
6 SHEETS—SHEET 1.

WITNESSES
E. M. Callaghan
Amos W. Hait

INVENTOR
JOHN F. PARKER
BY Munn & Co.
ATTORNEYS

J. F. PARKER.
CASH REGISTER AND INDICATOR.
APPLICATION FILED AUG. 4, 1908.

913,551.

Patented Feb. 23, 1909.
6 SHEETS—SHEET 4.

WITNESSES

INVENTOR
JOHN F. PARKER
BY
ATTORNEYS

J. F. PARKER.
CASH REGISTER AND INDICATOR.
APPLICATION FILED AUG. 4, 1908.

913,551.

Patented Feb. 23, 1909.
6 SHEETS—SHEET 5.

WITNESSES

INVENTOR
JOHN F. PARKER
BY
ATTORNEYS

UNITED STATES PATENT OFFICE.

JOHN F. PARKER, OF KANSAS CITY, MISSOURI

CASH REGISTER AND INDICATOR.

No. 913,551.     Specification of Letters Patent.     Patented Feb. 23, 1909.

Application filed August 4, 1908. Serial No. 446,943.

*To all whom it may concern:*

Be it known that I, JOHN F. PARKER, a citizen of the United States, residing at Kansas City, in the county of Jackson and State of Missouri, have invented an Improvement in Cash Registers and Indicators, of which the following is a specification.

My invention consists of certain improvements upon cash-registers such as that shown and described in Letters Patent of the United States No. 464,294, dated December 1, 1891, and 483,511 dated September 27, 1892, granted to Hugo Cook, No. 514,670, dated February 13, 1894, to J. P. Cleal, and 580,378 dated April 13, 1897 to Cleal and Reinhard, also the machines forming the subject of my pending application Serial No. 427,380, filed April 16, 1908, and my application No. 446,400, filed August 1, 1908. It will be understood however from the description hereinafter given that many of its features are not restricted to such machines but are applicable to others also.

In the drawings, for the purpose of illustration I have shown my improvements as applied to a machine substantially as described in the aforesaid patent to Cleal and Reinhard No. 580,378.

One of the distinctive features of this invention as of the inventions covered by my pending application is a bank of keys provided for registering and indicating the nine different amounts, in cents, ending with the numeral "5" such as 15, 25, 35, &c. It has been necessary in machines of the above classes to operate two keys in order to register any of the above amounts while in my improvements, the same results are accomplished by the operation of one key only.

Another distinctive feature of my machines is the means for indicating the amounts so that they are exhibited from the four sides of the register making them visible from any part of the room.

While I do not show in my drawings or describe the printing mechanism as in the above Patent No. 580,378 before referred to, it will be understood that my improvements will not interfere with the installing of this or any other printing mechanism which is adapted to registers of this class.

Another feature of my invention is a setting key or lever for indicating the initial of clerks or special transactions such as "Cash," "Charge," "Paid out," etc. In this respect the arrangement of the mechanism is such that after setting the key to indicate a particular transaction the machine will repeat indicating the same at each subsequent operation without again operating the lever. In this manner the salesman's time and labor are minimized for in the general run of business the majority of transactions are for cash or the same clerk's initial might be used a successive number of times. A further improvement in this feature is in indicating these special items so that they are exhibited from the four sides of the register and above from the figures which indicate the amount of the transaction. Another feature of this setting lever is its action on the registering mechanism, viz. throwing the above mechanism out of operation when the lever is set to indicate such transactions as "Charge", "Paid out", etc., since these items should not be added and yet it is essential they should be indicated and recorded. While the above lever when set to indicate such items as Cash, Received on account, etc. returns the mechanism to its normal position so that all such transactions are registered as well as indicated.

The details of construction, arrangement and operation of my invention are as hereinafter described and illustrated in the accompanying drawing in which—

The type of cash-register to which my invention as shown is applied is fully described in the patent to Cleal and Reinhard No. 580,378, before referred to, so that I shall describe only so much of that cash-register as is necessary to an understanding of my invention, reference being had for a fuller description to the prior art.

Figure 1:
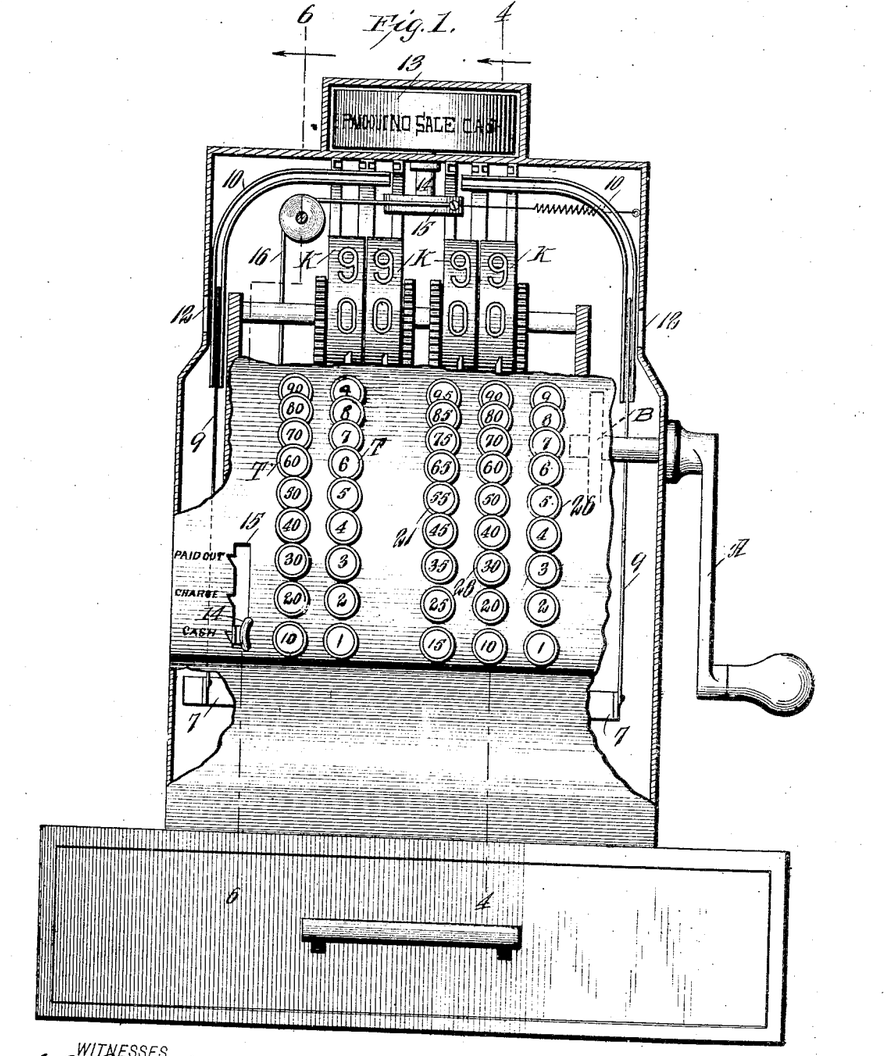
Figure 1 is mainly a front elevation of the machine, portions of the casing being in section to show interior constructions.
Figures 4, 5:
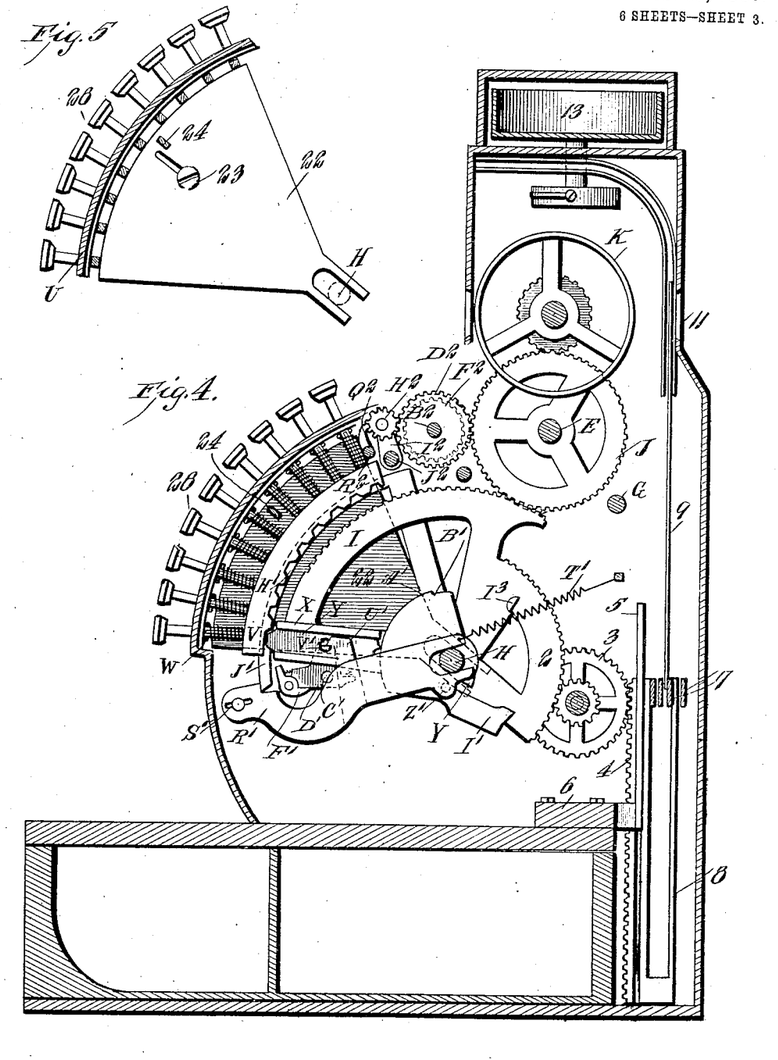
Fig. 4 is a vertical transverse section on the line 4—4 of Fig. 1.
Fig. 5 is a section showing a row of keys and a depressible member with which they are operatively connected.
Figures 6, 7, 8, 9:
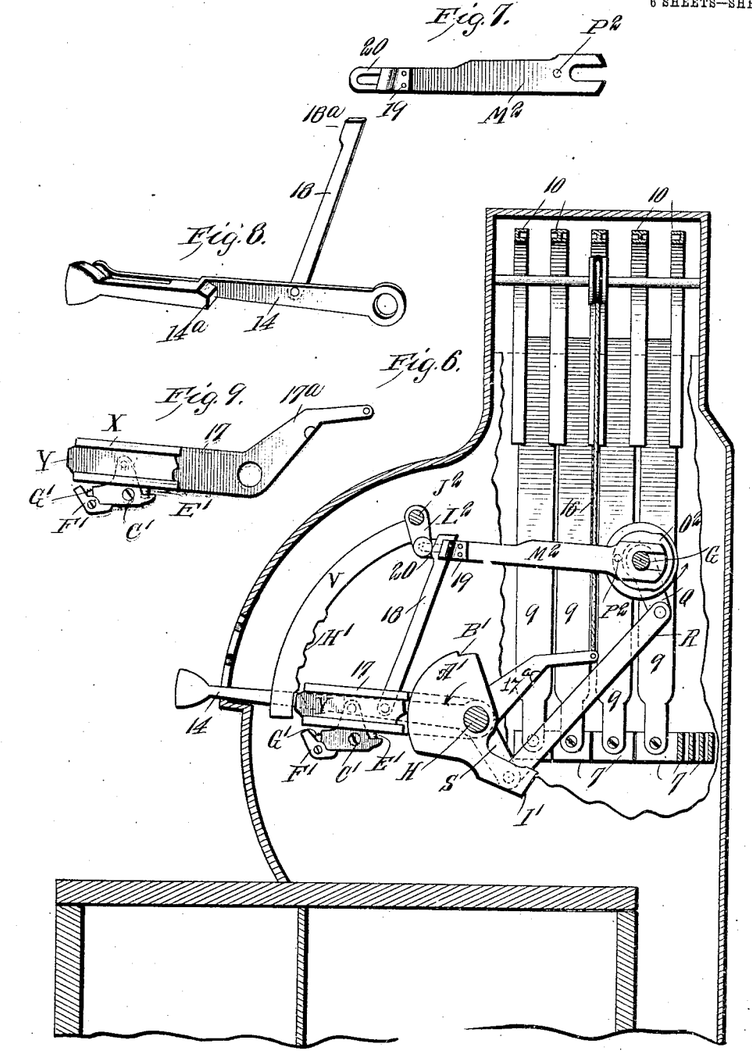
Fig. 6 is a vertical transverse section on the line 6—6 Fig. 1.
Fig. 7 is a face view of a bar for throwing the adding mechanism into and out of operation.
Fig. 8 is a perspective view of the so-called department key or setting lever.
Fig. 9 is a face view of a lever which coacts with the department key for actuating the indicating wheel.

The hub of the operating handle A of the machine is loosely mounted upon a stub-shaft projecting from the framework, Fig. 1, and has fast upon it a gear B, which meshes with a second gear C upon a second stub-shaft. The gear C meshes with a gear D, upon another stub-shaft and gear D meshes with a gear F, fast upon a rotary shaft G. The shaft G extends across the machine to the left side thereof. A rock shaft H is journaled in the lower middle part of the machine. Loosely mounted upon this shaft are four gear-toothed segments I, Fig. 4. Meshing with each segment is a gear-wheel J, by means of which the four indicator-wheels K, Figs. 1 and 4, are geared to the respective segments. These four indicator-wheels are adapted to expose their indicating members to view at the front of the machine. Interposed in the shaft G at its lefthand end, Fig. 6, is a crank Q, which is connected by a pitman R with an arm S, fast upon the rock-shaft H, by which means at each revolution of the operating-handle and shaft G the shaft H is thrown forward and backward a definite distance.

As before stated, the segments I, which are geared to the indicators in the manner before explained, and which also actuate the register in the manner hereinafter described, are loose upon the shaft H, and the latter is caused to impart different degrees of its movement to the indicators and register by connecting the segments I with and disconnecting them from it, and the next feature consists of means for this purpose. As in the prior machines of this character, a latch or coupling device is interposed between each segment and the shaft for this purpose, and each latch coöperates with one of the sets or series of keys, mounted radially to the shaft H in suitable guide-plates U, V and yieldingly held in and returned to their outer positions by coiled springs surrounding them between the two guide-plates and confined between the plate V and pins W, passed through the stems of the keys.

Formed upon one side of the lower radial supporting arm of each segment I is a guideway X, Fig. 4, in which fits a sliding latch-plate Y, pulled rearward by a spring and bearing at its rear end against the curved forward edge of a plate A' fast upon the shaft H. The plate A' is cut away at its upper rear corner to form a shoulder B'. When the shaft H is rotated forward by turning the operating-handle, the curved forward edge of the plate A' moves past the rear end of the latch-plate Y until the shoulder B' clears said plate, whereupon the spring pulls the plate Y rearward and causes its rear end to catch over said shoulder. The result of this operation is that just at the end of the forward movement of the rock-shaft H the latter will become coupled to the segment I by means of the plates A' and Y, and during its return backward movement will carry the segment with it until the plate Y is disengaged from the shoulder B' of the plate A'. The means for effecting this disengagement is the following: Pivoted at C' to a pendent extension of the segment I, Fig. 4, is a bell-crank plate D', and is loosely pivoted to the sliding latch-plate Y. The lower horizontal portion of the plate D' extends forward beneath the front end of the guideway X, while in rear of its pivot the plate is provided with a projecting lug, between which and the under side of the guideway X is interposed a spring E'. This spring acts, as does the spring Z, heretofore referred to, to press the latch-plate Y rearward, and one or the other of the springs may be dispensed with without affecting the mode of operation of the parts. Pivoted to the lower corner of the front end of the plate D' is a trip F' whose upper end is pressed outwardly by a spring G', interposed between it and the end of the plate D'. The lower rear end of the trip bears against the under side of the plate D' and limits the outward movement of its upper end under the influence of the spring G', while said upper end of the trip is free to yield inwardly to pressure which will overcome the resistance of the spring G'. Whenever any one of the keys is pressed inward to its limit of movement, its inner end will be projected into the path of travel of the upper end of the trip F', so that when, during the backward movement of the segment with the rock-shaft, the trip strikes the end of such key it will be arrested thereby and its pressure against the key will rock the bell-crank plate D' upon its pivot C', and thereby throw the latch-plate Y forward and disengage its rear end from the shoulder B' of the plate A', thus uncoupling the rock-shaft and segment and permitting the latter to come to rest at the point determined by the particular key which has been pressed in, while the shaft and plate A' move on backward to normal position. The inner guide-plate V of each set of keys has secured to or formed upon it a flange provided with notches H' along its curved inner edge, and the front end of the latch-plate Y is shaped to fit these notches when thrown forward to uncouple the segment from the rock-shaft in the manner above described.

Formed integral with the lower rear end of each plate A' or otherwise made fast upon the shaft H is an arm I' and fixed to the segment I is a stop pin $I^3$ in the same vertical plane. The distance between the upper side of the rear end of this arm and the stop-pin of the segment is such that the arm I' will contact with the pin of the segment just as the shoulder B' of the plate A' clears the rear end of the latch-plate Y, so that as soon as said latch-plate has been moved rearward by the springs the segment will be positively moved forward by the rock-shaft. By this means during the first half of each operation of the machine all of the segments which have been operated at the preceding operation will be carried forward to initial position and the indicator-wheels caused to present their ciphers at the indicating-points.

For the purpose of holding any key in its inner position after it has been pressed in the keys are provided with notches, which coöperate with lugs upon a detent-plate J', supported by radial arms upon the rock-shaft H, there being one of these plates for each row of keys, constructed and arranged to coöperate therewith. Mounted beside each of the plates A' is a sliding latch-plate R', supported at its rear end upon the shaft H and at its front end upon a screw S', entering the framework, and pulled rearward by a spring T'. Each of these latch-plates R' coöperates with the lower end of one of the detent-plates J', the latter normally engaging a shoulder upon the upper edge of the front end of the plate R', as seen in Fig. 4, to hold the latter from rearward movement under the influence of its spring T' until the detent-plate is lifted by pressing in some one of the keys. Each plate R' has secured upon its side adjacent the plate A' and segment an upwardly-extending plate U', adapted to coöperate with a stud V' upon the side of the latch-plate Y. When any key in the series is pressed in, and the detent-plate J' thereby lifted and its lower end disengaged from the shoulder of the sliding plate R', the latter will be pulled rearward by its spring T' and the plate U' be carried away from the stub V' so that the latch-plate Y is then free to move rearward, as soon as the shoulder B' of the plate A' has been carried below its rear end. At the resetting of the segments, during the first half of the operation of the machine, the studs V' upon the latch-plate Y will contact with the upper forward corners of the plates U' thus before the segments have reached their forward limit of movement, and the latches will be forced forward as the studs ride over said plates and the rear ends of the latches be thereby disengaged from the shoulders B' of the plates A'. This is the operation assuming that no key in any row has been pressed in, but if a key in any given row has been pressed in, then the sliding plate R' corresponding to such row will have been pulled rearward by its spring T' and its plate U' have been carried so far rearward that it will not serve to disengage the latch Y from the shoulder B' at the end of the forward movement of the parts, and the segment will therefore remain coupled to the rock-shaft and be carried backward by it.

Near the end of each operation of the machine all the plates R' are thrown forward to normal position, permitting the detent plates J' to drop behind the shoulder upon the plates R' and release the operated keys, by cams or other projections Y' fast upon the rock shaft, which projections contact with studs Z' upon the plates R' and force them forward.

From the foregoing description it will be understood that when a key in any set is pressed in and the operating handle then given a complete revolution the segment I corresponding to such set of keys will be coupled to the rock-shaft H and be carried backward with said shaft a distance proportionate to the position and value of the operated key, and that such backward movement of the segment will turn the corresponding indicator wheels to expose to view at the front of the machine indicating-numbers representing the value of such key. Such backward movement of the segment will also be transmitted to the registering mechanism to add the value of the operated key thereon, and that mechanism and the means for transmitting the movements of the segments to it, may be next described, reference being had more particularly to Figs. 4 and 6.

The registering-wheels are mounted upon a rotary shaft $B^2$, extending across the machine in front of the shaft E and journaled at its opposite ends in the framework of the machine. There are in this instance seven registering wheels mounted upon the shaft $B^2$, of which the right hand one is adapted to register units of cents and coöperates with the right hand set of keys and associated mechanism, the second one registers tens of cents and coöperates with the second set of keys, etc. Four wheels are driven by the respective segments I, with which they are thrown into and out of gear for that purpose.

Loosely mounted upon the shaft $B^2$ (or upon the extended hubs of the registering wheels) are four pinions $D^2$, one for each of the four registering wheels, Fig. 4. These four pinions are permanently geared, directly or indirectly, to the respective gears J, which mesh with the respective segments I as heretofore described. The pinions D² are thus turned forward and backward by the movements of the segments I. Each pinion D² has fast upon its side a smaller pinion F², which is operatively connected with wheels through the medium of smaller pinions H² mounted upon arms A² secured fast upon, and projecting upwardly from, a rock shaft J², which extends across the machine below and in front of the train of wheels on shaft B². One of the pinions H² is located adjacent to each of the pinions D², immediately in front of a pinion F² and meshes with the latter when thrown rearward by rocking shaft J². It is unnecessary to describe this mechanism further, since it is merely adjunctive to this machine, but, for details, reference may be made to the patent of Cleal No. 580,378, before referred to. It suffices to understand that, so long as the pinions H remain in their forward position, shown in Fig. 4, the pinions D² will remain disengaged from their respective registering-wheels and be idly turned by the gears J and segments, but when the shaft J² is rocked and the pinions H² are thrown rearward into mesh with the pinions F², the pinions D² will be connected with the pinions registering-wheels, so that the latter will be positively geared to the segments I and the movements of said segments be transmitted to them. The rock-shaft J² has secured to it a depending arm L², Fig. 6, to which is pivoted the front end of an arm M², whose rear end is slotted and embraces the rotary shaft G, heretofore described. A cam O², fast upon the shaft G, coöperates with a pin P², upon the side of the arm M², to throw said arm forward and backward at each operation of the machine and revolution of the shaft G, and the adjustment of the parts is such that the arm M² will be thrown forward at the beginning of the backward movement of the rock-shaft H to carry the pinions H² into mesh with the pinions F², G², so that the backward movements of any of the segments I, will be transmitted to the corresponding registering-wheels. Before the rock-shaft H has completed its backward movement, but after the segments I have been given their complete backward movements, the cam O² will draw the arm M² rearward again and disengage the pinions H² from the pinions F², G² and they will remain so disengaged during the forward movement of the rock-shaft and forward resetting movement of the segments I at the next operation of the machine. In this manner and by this means the registering-wheels are thrown into gear with the segments at the beginning of the registering movements of the latter and out of gear with them at the end of their registering movements, so that during the time the wheels are to be actuated by the segments they are positively geared to them, while during the time they are not to be actuated by the segments they are wholly disconnected from them. For the purpose of locking the pinions H² from turning while in their forward positions and holding them in proper position to mesh with the pinions F², D² when thrown rearward there are provided a series of fixed locking arms or dogs Q², fast upon a fixed shaft R² and adapted to engage the pinions H² when the latter are thrown forward and lock the same, Fig. 4.

The transfers between the registering-wheels are effected by substantially the same devices as those shown and described in Patent No. 464,294, heretofore referred to, and need not be shown and described in this case.

Figures 2, 3:
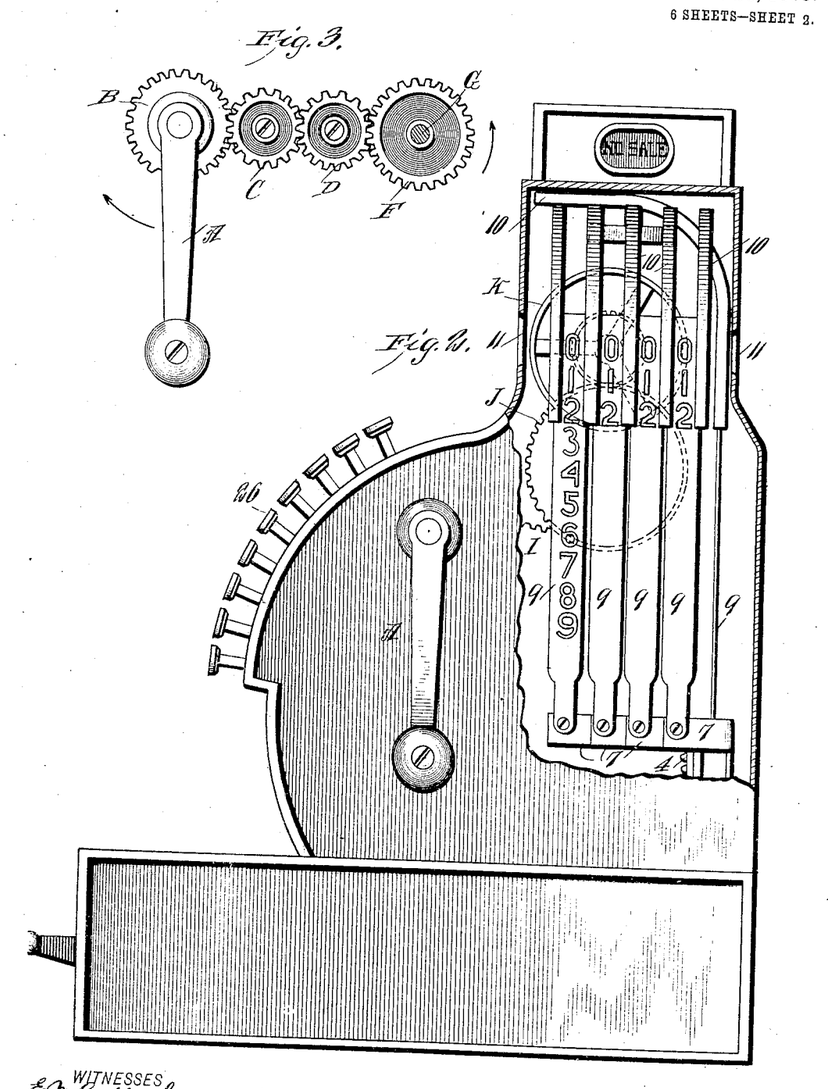
Fig. 2 is mainly a main view of the machine, a portion of the casing being in section, as in Fig. 1.
Fig. 3 is an end view of the gearing directly connected with the crank shaft.
Figure 10:
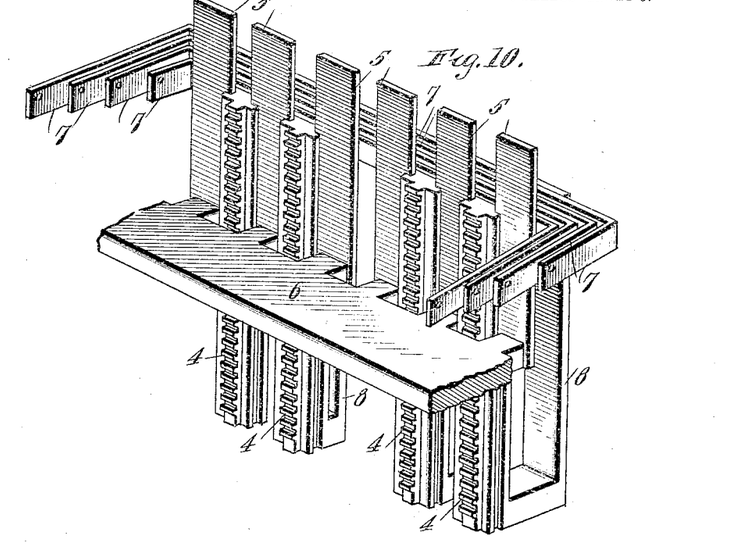
Fig. 10 is a perspective view of racks and connected parts for operating the indicating mechanism.
Figures 11, 12:
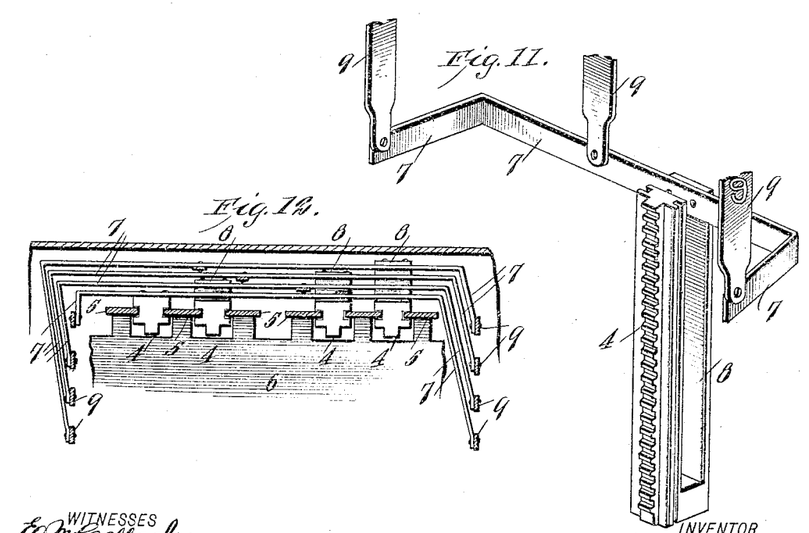
Fig. 11 is a perspective view of one of the vertical sliding racks with flexible indicating straps attached.
Fig. 12 is a horizontal section of the vertically slidable racks and connected parts for operating the indicating mechanism.

I will now describe the features of the machine which embody my invention, and, for the purpose of more clearly distinguishing them, the parts concerned will be indicated by numerals. As shown in Fig. 4, each toothed segment I is provided with an extension 2 which is in the form of a smaller segment provided with teeth for operating gearing 3 by which vertical reciprocation is imparted to slidable racks 4. The latter, as shown in Figs. 10 and 11, are provided with lateral grooves which receive vertical fixed guides 5, the same being attached to a horizontal portion 6 of the frame of the machine. Horizontal bars 7 (see Fig. 12) are rigidly connected with the several rack bars, the attachment being such as described in my aforesaid application Serial No. 446,400. That is to say, the inner horizontal bar 7 is attached directly to the back of the left hand rack, but the three other racks 4 are provided with arms 8, which are rigidly attached thereto at their lower ends, and arranged parallel to, and spaced from, the bodies of the racks in order to accommodate the horizontal bars attached to other racks. Thus space is provided between the arms 8 and the bodies of the racks for vertical movement of the horizontal bars 7 as required for operating certain indicators, as hereinafter described. As shown in Fig. 12, it will be seen that the horizontal bars 7 are arranged parallel and bent at an obtuse angle on the right, and an acute angle on the left in order to bring their end portions in the position required to provide for attachment and proper location of flexible indicating strips 9. These, as shown in Figs. 2, 4 and 6, extend upward and slide in grooved guides 10 which are bars arranged parallel and curved from the vertical to the horizontal, as indicated in Fig. 4. The strips 9 bear numerals from 0 to 9, and are made of some duly flexible material, such, for instance, as sheet brass or sheet steel, so that when forced upward by elevation of the racks, 4, they will slide in the grooved guides 10 and conform to the curve of the latter. It is apparent that by such curve and the flexibility of the strips 9, I avoid an objectionable vertical extension of the dome or upper portion of the casing of the machine, which would otherwise be necessary in order to accommodate the strips in their vertical adjustment.

Figs. 1 and 4 show strips 9 arranged at the back of the machine, which is provided with slots 11 through which numbers etc. on the strips may be seen when the same are properly adjusted. Figs. 1, 2, and 6, on the other hand, show the arrangement of strips 9 at the ends of the machine, for indicating numerals through slots 12 in the casing. Those strips which are attached to the bent ends of the horizontal bars 7, as shown in Fig. 12, are the same as appear at the ends of the casing in Figs. 1, 2, and 6, and those which are attached to the middle portions of the said bars 7, as shown in Fig. 12, are the same as appear at the back of the machine in Figs. 1, 2 and 4. Inasmuch as the flexible strips 9, heretofore referred to, do not extend into the curved portion of the guides more than about half their length, they are preferably made somewhat thicker in the lower, than in the upper, portion. In the dome of the machine, I arrange a horizontal wheel 13, the same bearing the words "Cash", "Charge", "Paid out", and "No sale", arranged on four divisions or sections of its periphery and which will be seen through the slots, when the wheel is properly adjusted. The vertical pendent axis 14 of said wheel has a pulley 15 attached to enable it to be operated by means of a cord or wire 16 which is suitably connected with a lever for that purpose. So far as described, the construction, arrangement and operation of this wheel are the same as described in my aforesaid application Serial No. 446,400.

As shown in Fig. 6, the cord or wire 16 is attached to the rear arm 17ª of a lever 17 which is journaled on the shaft H. This lever is shown detached in Fig. 9. It is provided with a sliding latch plate Y in the same manner as the other guide-ways X forming attachments of toothed segments I, as shown in Fig. 4. In other words, this particular lever 17 is not provided with a toothed segment, but, instead, serves as the means for operating the indicating wheel 13 through cord 16. As shown in Figs. 6 and 9, it is provided like the segments with a pivoted attachment comprising a plate having the pivoted trip F' which is adapted for contact with a key. In this instance instead of a depressible key, I employ a pivoted lever key 14, see Figs. 1, 6, 8, the same being mounted loosely on the shaft H and adapted to be shifted vertically in the slot 15 in the front of the casing, see Fig. 1. One edge of such slot is provided with notches arranged opposite the words "Cash", "Charge", and "Paid out", and the lever 14 is provided with a spring-catch for engaging said notches, so that when adjusted to one position or the other, it will be held in place. The lever has a lateral projection or shoulder 14ª which is adapted for contact with the pivoted trip F' in the same manner as are the inner ends of the dollar keys T of the left hand bank. As has been before described, when the shaft G is rotated in the direction of the arrow Fig. 6, the notched segment plate A' is carried downward in the direction of the arrow, and when its notch B' has passed the inner end of the latch plate Y, the latter is retracted or pushed inward by aid of the spring E' or by a supplemental spring, not shown, so that it passes out of engagement with the notches of the curved guide plate V and its inner end being engaged with the notch B' of the plate A' the lever 17 will be carried along with the said plate and thus the wheel 13 will be rotated to a position to give the proper indication through the slots of the dome. It is obvious that this adjustment and position of the wheel 13 will correspond to the adjustment of the lever 14 in the notches indicated by "Cash" "Charge" and "Paid out." It will be understood that this lever 14 which, owing to its function, may be further indicated as the "department" key whatever its adjustment, the nose or shoulder 14ª of the same will always be in the path of the pivoted trip F', so that the nature of the last transaction, such as "Cash" for example, will be repeated at each operation of the machine, or until the lever shall have been moved to another notch. I provide this department lever 14 with an attachment for the purpose of throwing into and out of operation the adding mechanism (not shown) so that the machine when operated will not add when the key is moved from the lowest or "Cash" position shown in Figs. 1 and 6. In other words, the adding mechanism is always thrown out of action when the lever key 14 is adjusted opposite the words "Charge" or "Paid out" for an obvious reason. The attachment referred to is a bar 18 see Figs. 6 and 8, the same being pivoted to the lever 14 at a point intermediate its shoulder 14ª and its fulcrum. The outer or free end of this bar 18 has a swell or cam projection 18ª on its outer side and is adapted to slide in a guide 19 provided at the outer end of the slidable arm M², see Figs. 6 and 7. The said end of the arm M² is provided with a lengthwise slot 20 which receives the wrist pin of the crank L² that is fixed on the rock shaft J² which controls the position of the pinion H², see Fig. 4, or in other words, serves to throw the adding mechanism into and out of action. When the bar 18 is adjusted with its cam 18ª between the guide 19 and the wrist pin of the crank L². As shown in Fig. 6, the adding mechanism will be thrown into action, when in the revolution of the shaft G, its cam forces the arm M² to the left. It will be seen that this position of the cam 18ª always occurs when the setting lever 14 is adjusted opposite "Cash" as shown in Figs. 1 and 6. On the other hand, when the lever 14 is adjusted in either of the other two notches, that is to say, opposite "Charge" or "Paid out", the said cam 18ª will be carried beyond the guide 19 and thus the narrower portion of the bar 18 will be interposed between the guide and the wrist pin of the crank; so that when the arm M² is pushed outward by cam of shaft G, crank L² will not be moved, and hence the shaft J² will not be rocked and the adding mechanism will consequently not be operated.

Figures 13, 14, 15, 16:
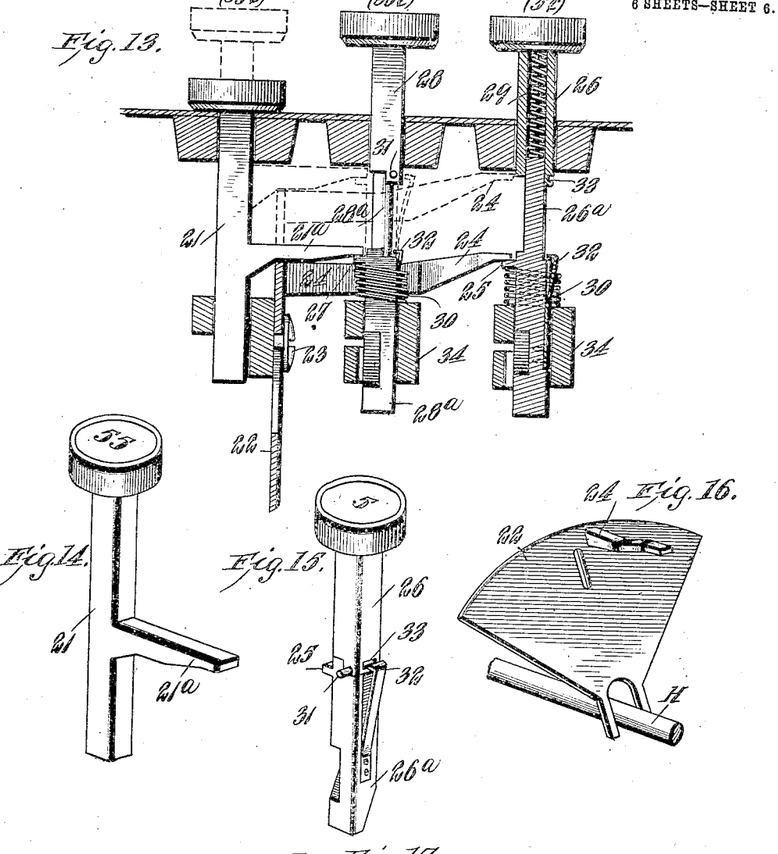
Fig. 13 is a detail sectional view illustrating the connection and operation of certain keys.
Fig. 14 is a perspective view of one of the depressible cents keys bearing multiples of 5 which end with 5.
Fig. 15 is a perspective view of a key in the tens of cents bank and also the fifth key in the units of cents bank.
Fig. 16 is a perspective view illustrating a depressible member through which a depressible key acts upon an adjacent key for indicating at one operation any multiple of five ending in 5.
Figure 17:
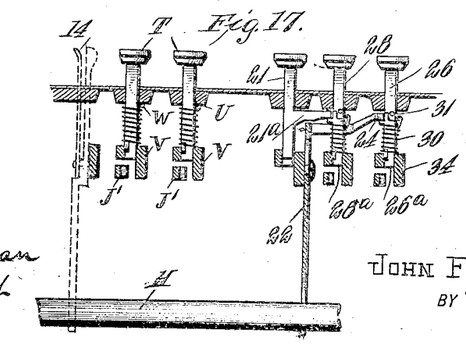
Fig. 17 is a longitudinal section of the front of the machine in a plane directly below the fifth key of each bank.

In Figs. 13 to 17, I show the arrangement of the three sets of keys which embody my improvement in this part of the machine. As shown in Fig. 1, the bank of keys on the right indicates units-of-cents, the next bank tens-of-cents, and the third bank indicates cents which are multiples of 5 and end with the numeral 5. If it be desired to register any number of cents from 1 to 9 inclusive, the appropriate key in the right bank is depressed and registration will be effected accordingly. The same result will ensue if any key in the second bank be depressed or in other words, by depression of any key in the second bank, any number of tens-of-cents up to 90 may be registered. If, however, it be desired to register any number of cents which is a multiple of 5 and between 15 and 95, I am able to effect this result by the depression of a single key, whereas, in cash registers of this class and the particular one upon which this invention is an improvement, it is necessary to operate two keys to effect the same result. The keys 21 in the third bank, see Fig. 13, are adapted to slide in guides, and their inner ends work in guideways but do not extend into engagement with any other parts. In other words, the function of these keys is solely to operate on or perform the functions of other keys as will soon be apparent. Each of these keys is provided with a lateral arm 21ª which is adapted for contact with the curved edge of a sector shaped plate 22, see Figs. 4, 5, 13, 16, 17, the same being provided with a lengthwise slot that receives a guide screw 23 and its inner end being forked to embrace the shaft H which serves as a guide in its radial adjustment. It is apparent that if any one of the keys 21 in the third bank be depressed, its arm 21ª will similarly depress the sector 22. The sector 22 is provided with a lateral arm 24 which extends into contact with a lug or shoulder 25 formed on the shank 26ª of the fifth key 26 in the right hand bank or units of cents column. The arm 21ª of the keys 21 also bears upon the lug 27 formed on the shank 28ª of each key 28 in the second or tens of cents bank. It will now be seen that if any key 21 of the third bank, say that which is numbered 55, see Figs. 13, and 14, be depressed as indicated by full lines Fig. 13, the shank 28ª of the adjacent key in the tens of cents bank, in this instance the key marked 50, will be depressed through its engagement with the arm 21ª of the key 21, and also that the shank 26ª of the key 26 which is the fifth in the row of the sets of units-of-cents bank will be similarly depressed and thus fifty-five cents will be indicated and registered through the subsequent operation of the machine. In other words, through depression of any key 21, in the third bank, any number of cents which is a multiple of 5 and ends with 5 may be registered; thus it is not necessary to operate two keys for this purpose as heretofore. As has been before intimated, the arm 24 of sector plate 22 is operatively connected with but one key, to wit, the fifth in the units of cents bank, also that each of the keys 21 in the third bank is provided with a lateral arm 21ª as shown and has been already described, so that it may act upon the adjacent key in the tens-of-cents bank and depress the same. It will be seen, therefore, that the keys in the third bank have no direct function in respect to registration, but are employed solely to act upon other keys which effect registration, as described. In order that the heads or larger portions of the keys 26 and 28 in the units-of-cents and tens-of-cents bank may remain immovable when the key 21 in the third bank is depressed, as already described and shown in Fig. 13, I construct the nine keys 28 in the tens-of-cents bank and the five cent or fifth key in the units-of-cents bank in two parts, Figs. 13 and 15, the outer portion being tubular and the inner portion 26ª and 28ª being provided with a reduced portion or tenon adapted to slide therein. A spiral spring 29 is interposed by the outer and inner portion of each of these keys. A stronger spiral spring 30 encircles the shank 26ª and 28ª of each of the keys, and serves normally to elevate the shank and support it in normal position, which is indicated in Figs. 15 and 17. Each of the outer tubular portion of the keys 26, 28, are provided with lateral pins 31, to prevent them being projected too far through the casing, which would result from the action of the spring 29.

In Fig. 17 the shanks 26ª and 28ª of keys 26, 28 respectively, are shown supported by springs 30 in contact with the outer or tubular portion. When these shanks are depressed, as indicated in Fig. 13, the springs 30 are alone compressed, the springs 29 extending correspondingly. It is, however, desirable that the operator of the machine shall know with certainty that when the head of a key in either of the first two banks is depressed, its inner end shall have reached, and shall be retained, by engagement with the sector J' and thus he could not know if the head were allowed to immediately resume its normal extended position shown in Figs. 13 and 17. I, therefore, provide means for locking together the two parts of each of these keys when depressed. To this end, a spring catch 32 is attached to the side of each of the shanks 26$^a$, 28$^a$, and projects upward and is adapted to engage a notch 33 formed on the lower end of the tubular portion of the key, see especially Fig. 15. When a key in either of the first two banks is depressed manually, it will be pushed in far enough to carry the catch 32 into the fixed guide 34 whereby the catch will be forced into engagement with the notch 33 and thus hold the outer portion 26 or 28 of the key in the depressed position, in other words, the two sections or portions of the key will be held in contact as indicated in Fig. 26 until the inner end or shank of the key shall be released in the further operation of the machine.

I claim:

1. In a cash register, the combination with curved guides, slidable rack bars, and means for reciprocating them vertically, of a like series of horizontal bars attached to said rack bars and having their end portions bent respectively at an obtuse and an acute angle, and their extremities arranged in alinement, and vertical indicating strips attached to such extremities, whereby they are located as required relative to the lower end of the guide, substantially as described.

2. In a cash register, the combination with vertically movable bars and means for adjusting them, and a like series of horizontal bars attached to the vertical bars and arranged in different vertical planes and having their extremities projected inward and brought parallel to the same vertical plane, and vertical indicating bars secured to such extremities, substantially as described.

3. In a cash register, the combination with indicating mechanism, of means connected therewith for operating it, the said means consisting of a vertical bank of nine depressible keys which represent the nine amounts ending with the numeral five, from fifteen to ninety-five inclusive, and devices that operatively connect them with keys of two adjacent vertical banks, whereby the depression of a key in the first named bank depresses keys in the other two banks, substantially as described.

4. In a cash register, the combination of indicating devices and means for operating them including two series of depressible keys, each key of the first series having a lateral arm, a depressible sector with whose curved edge the several arms are adapted for contact, the sector having itself an arm extended laterally, and a five cent key in the units-of-cents bank with which such arm is adapted to engage, whereby the depression of the first-named key effects the depression of the last-named one, substantially as described.

5. In a cash register, the combination with indicating devices, of a series of keys having each a lateral arm, a second series of keys having projections with which such arms are adapted for contact, a depressible spring-supported device 22 arranged between the two sets of keys and adapted for contact with the arms of the first-named series, said device having also a laterally extended arm, and a key of a third series provided with a shoulder for contact with such extended arm, and mechanism intervening the keys, and indicating devices for operatively connecting them, substantially as described.

6. In a cash register, the combination of indicating devices and means for operating them, comprising a depressible key composed of outer and inner parts adapted to slide on each other, a spring interposed between the two parts, another spring supporting the inner part in normal position, and means for operating the said parts, another key which is operatively connected with the slidable inner part of the first-named key, whereby such inner part may be depressed without moving the outer part, substantially as described.

7. In a cash register, the combination of a depressible key composed of inner and outer parts which are adapted to slide on each other, a spring supporting the inner one in normal relation to the outer one, a spring interposed between them, and an adjacent key which is provided with means for contact with, and depression of, the slidable inner part of the first-named key, substantially as described.

8. In a cash register, the combination with indicating devices, of means for operating them which include depressible keys formed in two parts that are slidable on each other, a spring interposed between them, a spring normally supporting the inner slidable part, a spring catch secured to the inner part and adapted to engage the upper one when pressed inward, whereby the two parts may be locked temporarily together in a depressed position, and a guide which forces the catch into locking position when the key is depressed, substantially as described.

9. In a cash register, the combination with a casing, indicating devices and means for operating them including two series of depressible keys, those of one series being formed of two parts which are slidable on each other, a spring interposed between said parts, the outer head part having a stop for limiting its outward movement due to the stress of the aforesaid spring, a stronger spring surrounding the inner part and normally supporting it in abutment with the outer part, the adjacent series of keys having means for engaging the two-part keys, substantially as described.

10. In a cash register, the combination with the register proper, driving mechanism and a rock shaft connected with the register for adjusting it into and out of gear with said driving mechanism, and a reciprocating arm loosely connected with the rock shaft, of a setting lever provided with an attachment in the form of a slidable cam bar which is interposed between such arm and the crank of the rock shaft and adapted when the lever is shifted, to lock the said arm with the rock shaft and thus throw the register into action, substantially as described.

11. In a cash register, the combination with a rock shaft having fast on it a crank arm and forming part of a registering mechanism, a train of gears by which such mechanism is operated, a setting lever 14 adapted to be adjusted for indicating different transactions, a device connected with said lever and having a sliding engagement with the crank arm on said rock shaft, whereby the adjustment of the lever affects the position of the register proper, substantially as described.

12. In a cash register, the combination with a member, of a registering mechanism proper adapted for throwing said mechanism into and out of action, and provided with an arm for adjusting it, an arm $M^2$ provided with a lengthwise slot a crank arm with which such slotted arm is adjustably connected, means for imparting endwise movement to said arm $M^2$, a setting lever under the control of the operator, and a bar pivoted thereto and having its free end provided with a swell or cam and working in a guideway in arm $M^2$, whereby when adjusted in one position, the register is thrown into action, and when adjusted in another position, is left out of action, substantially as described.

13. In a cash register, the combination with an indicator, of a lever 17 provided with a trip device, means connecting the lever with said indicator, a setting lever 14 under control of the operator, the same having a shoulder which is in the path of the trip, and rotary means for moving the lever 17, substantially as described.

JOHN F. PARKER.

Witnesses:
SOLON C. KEMON,
AMOS W. HART.